INVENTOR.
Maurice W. Hoover

ATTORNEY

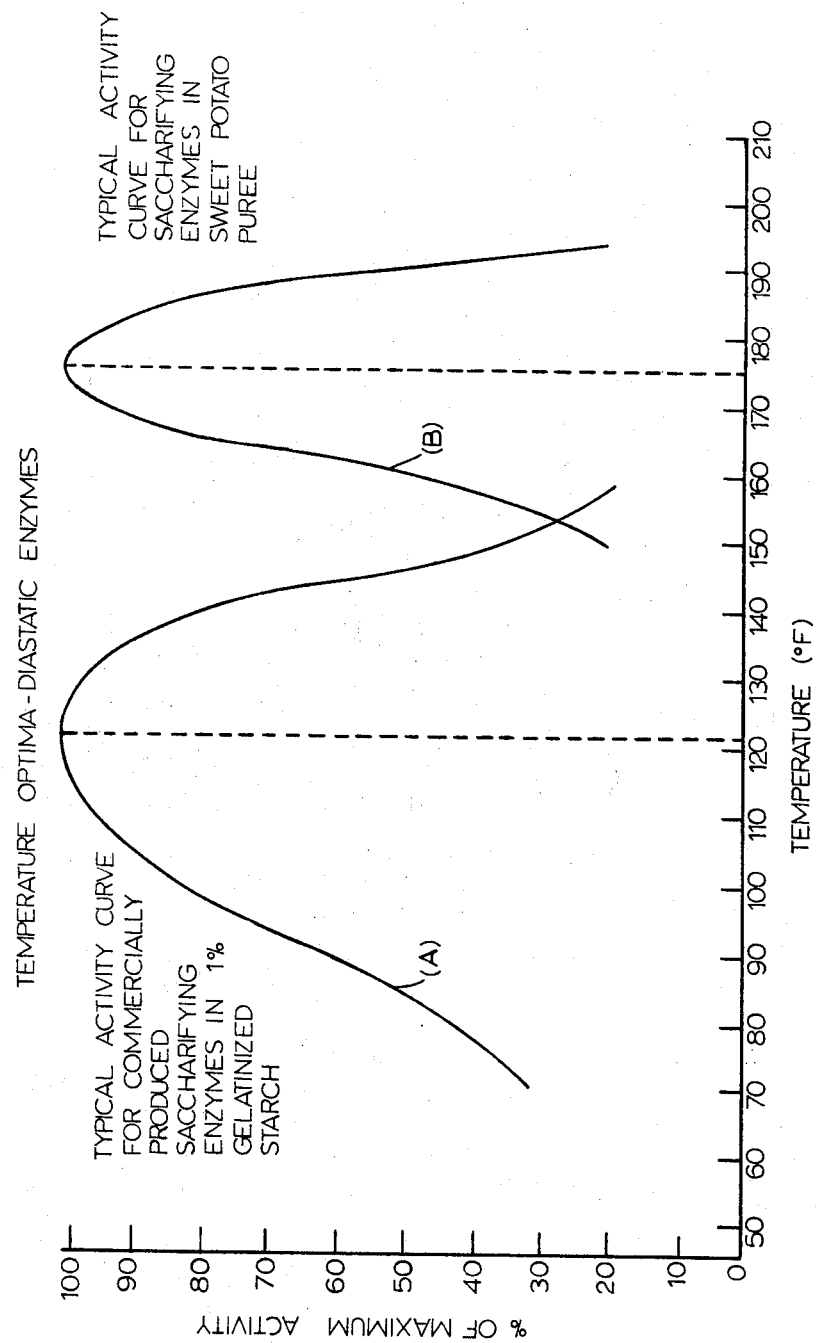

United States Patent Office 3,407,074
Patented Oct. 22, 1968

3,407,074
PROCESS FOR SACCHARIFYING AND
LIQUEFYING SWEET POTATOES
Maurice W. Hoover, Raleigh, N.C., assignor to North
Carolina State University at Raleigh, Raleigh, N.C., a
corporation of North Carolina
Filed June 7, 1965, Ser. No. 461,633
11 Claims. (Cl. 99—100)

ABSTRACT OF THE DISCLOSURE

A process for saccharifying and liquefying sweet potatoes includes the steps of reducing the roots whether aged and cured or freshly harvested to a fine particle, puree form, then flashing successive quantities of the puree with heat such that the temperature thereof substantially instantaneously rises to some value within a predetermined temperature range dependent on the variety and history of the particular root and which temperature is sufficient to initiate a self-sustaining enzyme activity, then holding the heated puree in bulk form while any further temperature change is gradual and does not rise above or below respective predetermined high and low temperatures and maintaining such heated bulk state for some predetermined time to obtain a controlled hydrolysis of the starch and then raising the temperature sufficiently to stop the enzyme activity and conclude the cooking preparatory to canning, freezing, dehydration or the like.

---

Sweet potatoes when first harvested contain a relatively high proportion of starch to soluble solids in the form of sugars and the like. The freshly harvested potatoes are comprised mainly of cells which are rather dry, starchy and quite firm in texture and the potatoes lack sweetness and a good flavor. These adverse characteristics create problems in subsequent processing unless the roots are conditioned by curing and storing for a period of three weeks or longer. Moreover, some varieties of sweet potatoes never attain a degree of conditioning that will eliminate these adverse characteristics.

When freshly harvested, uncured or starchy roots are manufactured into finished products by method currently known in the art, such as canning, freezing or dehydration the high starch to soluble solids relationship is carried therethrough resulting generally in the production of a low quality processed product. For example, when freshly harvested, uncured roots are pureed and canned, the product is starchy, lacks sweetness and the presence of a large proportion of starch in the product causes it to form a thick, firm gel which has a tendency to shrink, crack and to allow syneresis. This is objectionable from a consumer acceptance standpoint. Frozen products produced from the same type of raw material also have the same objectionable characteristics although generally to a lesser degree. When freshly harvested, uncured and starchy roots are dehydrated by drum drying following the preparation steps of peeling, trimming, cooking and pureeing which are steps in the processing thereof known in the art, the resulting dehydrated product has a starchy, inferior texture and a displeasing flavor. Furthermore, the processes of the prior art are very time consuming due to the failure of the puree to stick properly to the drums; this failure results also in a very thin, porous, lacy product having a low bulk density. By properly controlling the starch to soluble solids ratio of the sweet potato puree, a finished dehydrated product of superior quality can be produced with greater efficiency.

Until the present invention, the only ways known in the prior art for controlling the starch to soluble solids ratio of processed freshly harvested, uncured roots were either to cure the roots at approximately 85° F. for five to seven days followed by storage for a few weeks at about 60° F. or to add commercial saccharifying enzymes to the cooked and partially cooled puree. The assumption was made that the naturally occurring saccharifying enzymes which consist primarily of beta amylase were either not present or, if present, were in such low concentrations that the proper hydrolyzation of the starch to a sugar could not be obtained. Reasons could be postulated as to why the saccharifying enzyme activity in freshly harvested and starchy roots is practically nonexistent under prior art conditions. It is believed that the efficacy of the saccharifying enzymes present in the freshly harvested and starchy roots is inhibited by some substance associated therewith; therefore, once the enzyme inhibitor is inactivated or destroyed, saccharification of the starch readily occurs. Another theory is that an opposing enzyme system is present in the freshly harvested or starchy roots that produces starch at or about the same rate as amylase hydrolyzes starch thus nullifying the net effect of amylase activity. As a result of data obtained in reducing the present invention to practice, it was found that sufficient saccharifying enzymes were present in sweet potatoes, including freshly harvested and starchy roots, to cause the desired saccharification under proper processing conditions.

An object of this invention is to provide a method for producing canned, frozen or dehydrated sweet potato products that exhibit the most desirable color, nutritional and flavor characteristics obtainable from sweet potatoes.

Another object of this invention is to provide a process which activates the naturally occurring enzymes in sweet potatoes thereby causing a saccharification of the starch therein.

A further object of this invention is to provide a process for producing from freshly harvested and starchy roots a high quality sweet potato puree having a low starch to soluble solids ratio.

Another object of this invention is to provide a method for effecting the hydrolysis of the starch in freshly harvested roots by activating and utilizing the naturally occurring saccharifying enzymes.

A still further object of this invention is to provide a method for eliminating the costly process of hydrolyzing the starch in sweet potatoes by the curing and storing thereof or by the addition of enzymes from commercial sources thereto.

The above and other objects and advantages of this invention will become more readily apparent when the following description is read in conjunction with the appended drawings, examples and claims.

Figure 1:
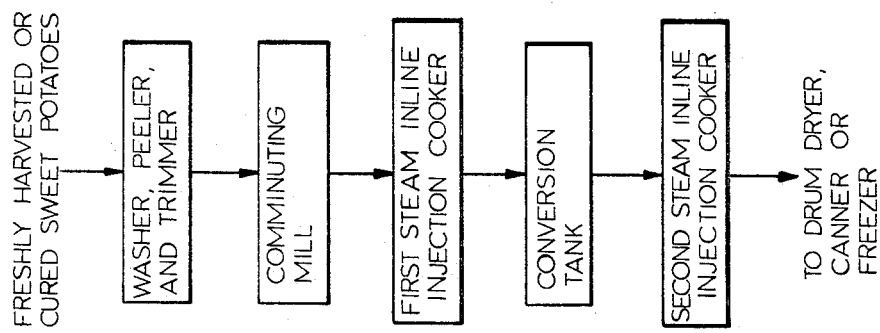
FIGURE 1 is a flow diagram showing the various steps required to complete the process when applied to freshly harvested or cured sweet potatoes.

FIGURE 3 compares a prior art graph (A) which was typically thought to be the temperature range for saccharifying gelatinized starch with a new graph (B) which has been found to be the ideal temperature range for saccharifying the starch in sweet potato puree.

In carrying out the method according to the present invention, either freshly harvested, starchy sweet potatoes or cured sweet potatoes are washed, peeled and trimmed. This is a step common in the prior art. The trimmed roots are then conveyed to a comminutor which reduces the particle size to approximately 0.03 inch in diameter. It was found that a particle size of this diameter gives a fine texture which insures an intimate contact between the enzymes and the starch thereby hastening the process of reducing the starch to soluble solids. The particle size may be comminuted to a lesser diameter without affecting the process and may have a diameter as large as 0.06 inch; however, a diameter larger than 0.06 inch causes the end product to be too coarse. The word "diameter'" when used in reference to particle size is the average distance through an average potato particle. After being comminuted to a puree, the total solids in the mixture ranges from about 20 percent to about 30 percent with the standard being 26 percent. The comminuting as described above takes place at room or ambient temperature after which it is force-fed by means of a sanitary pump to the first cooker.

The first cooker comprises an inline constant flow apparatus in which the puree is force-fed through a Venturi-type restriction where steam which ranges from 20 to 50 pounds per square inch is injected therein. The steam pressure is adjusted to raise the puree to the desired temperature at a given flow rate. The rate of flow through this restriction is about 30 feet per mintue with the range being from seven feet to 70 feet per minute. (The very nature of the puree and the fact that an inline steam injection cooker forces the puree into the form of a stream of continuous, successive, small quantities means that there will be an instantaneous response to the heat.) The steam instantly and thoroughly mixes with the puree, i.e. the potato particles, which reaches the optimum cooking temperature of 176° F. in approximately four seconds; however, depending upon the design of the restriction, it may take less than four or as much as eight to ten seconds to reach that temperature. As the puree travels from the first steam injection cooker, the temperature thereof may range from 160° F. to 185° F. At temperatures below 160° F., the puree is not warm enough to activate the enzymes which is necessary to hydrolyze the starch. At temperatures above 186° F., the enzymes are killed and saccharification of the starch in the puree stops. (Stated differently it has been found that when the sweet potato is reduced to puree form and then substantially instantaneously flashed to a temperature of at least 160° F. but not above 186° F. the enzymes are activated and the enzyme activity will be self-sustaining.) It also is noted that while the steam is in contact with the puree in this first inline cooker, the moisture content thereof will rise about 2 percent.

Figure 2:
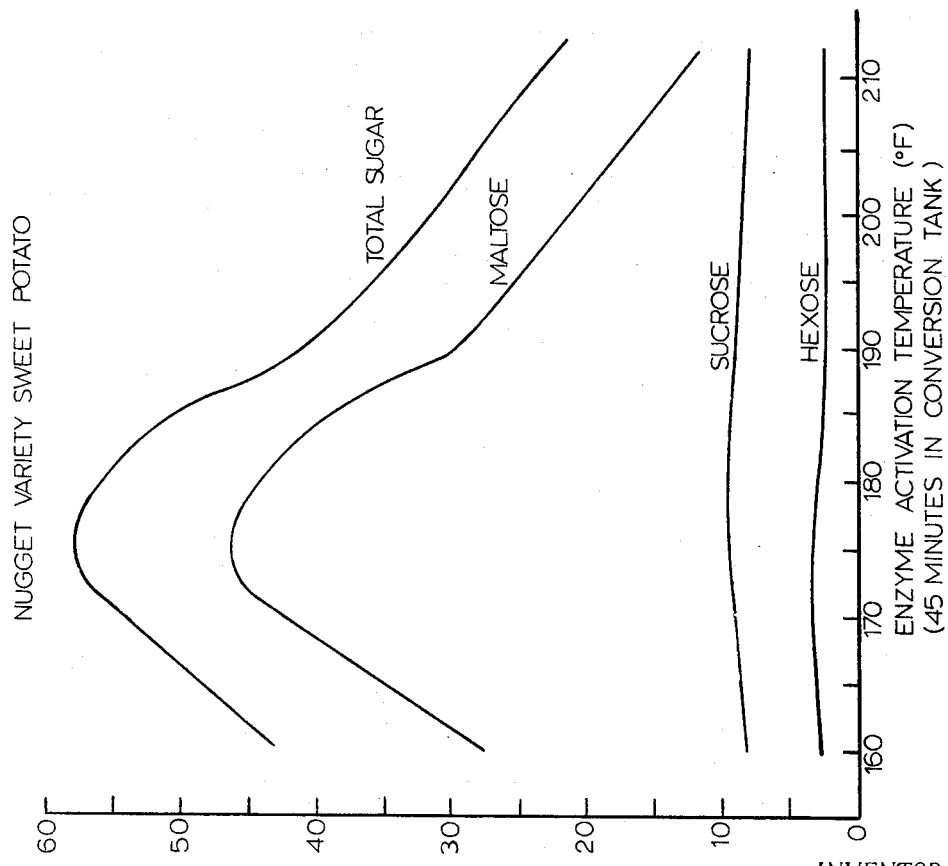
FIGURE 2 is a graph showing the percent of starch that is converted to sugar by means of enzyme action at the various temperatures with a 45 minute dwell time in the conversion tank.

After being raised to a temperature of approximately 176° F., the puree is force-fed into a conversion tank whereupon the puree is held as a bulk mass and the starch continues to be converted into dextrins and soluble solids, the soluble solids containing trace amounts of dextrose and other similar sugars. It is to be noted from FIGURE 2 that the potato initially contains a certain amount of sucrose and hexose; these sugars remain at a relatively constant level throughout the process. By saccharification, approximately 46 percent of the total potato solids is converted into sugar, and since the sucrose and hexose comprise approximately 12 percent of the total solids, the total sugar content after saccharification is about 58 percent. The remainder of the potato has been either converted into dextrins or remains as an insoluble solid; in other words, it has not been hydrolyzed. The temperature in the conversion tank ranges from approximately 140° F. to approximately 190° F. Beyond these ranges, the temperature is either not high enough for proper saccharification or is so high that it kills the enzyme action in the puree. (Note here that the temperature which activates the enzyme activity is obtained substantially instantaneously, e.g. in 4 seconds. However, once the enzyme activity has started and is self-sustaining the temperature of the puree mass in the conversion tank may gradually drop to 140° F. or gradually rise to 190° F. and the enzyme activity will still sustain itself.) It is to be noted that at the end of the holding or converting step, the puree consists of from 14 percent to 20 percent soluble solids—"soluble solids" meaning the various sugars therein. Where the resulting puree does not contain 14 percent soluble solids, the resulting product is too light and fluffy and will not stick to the drum dryer whereas if the puree has a soluble solids content of above 20 percent, the mass is too sticky and cannot be adequately dried on the drum dryer nor can it be easily separated therefrom. Therefore, it is important to gage the conversion of starches to soluble solids so that the puree leaving the conversion tank will be comprised of from 14 percent to 20 percent of soluble solids. (One of the important advantages of the invention is that dependent on the variety and history (i.e. degree of curing) of the roots the operator of the process can control the process to obtain exactly the results desired.) It is to be noted that the conversion tank may be run on a continuous basis or on a batch basis. The herein disclosed examples use the continuous basis where the cooked puree is pumped into the top of a column and at the same rate is bled off at the bottom with the result being that the puree remains in the conversion tank for the desired period of time. The batch type conversion tank is self-explanatory and is not used for it is not as efficient as the other.

After the proper saccharification has taken place, the puree is then force-fed through a line where it enters a second steam inline injection cooker. The cooker is similar to the first with the exception that the temperature of the puree is raised to a minimum of 190° F. and preferably to around 210° F. This temperature is sufficient to kill the enzymes and finish any remaining cooking thereby keeping the puree from having a raw or starchy flavor. The upper limits of this cooker is controlled by the degree of caramelization which may take place. Caramelization is the actual burning of the sugar which discolors the final product as well as making the same untasty. It is obvious that in this step the puree may be cooked under pressure or the like in order to complete the same; however, care must be taken not to overcook the puree or to localize the heat supplied thereto so that caramelization will be avoided.

The process as herein disclosed is substantially complete. It is to be noted that the puree from the second cooker may be poured into cans, sealed and heat sterilized by cooking for forty minutes or longer under steam pressure at a temperature of 240° F. or higher. Also, the puree may be frozen after being cooled by pumping the same through a heat exchanger. Furthermore, a color preservative consisting of one part tetra sodium pyrophosphate and three parts sodium acid pyrophosphate may be added to a portion of the puree at the rate of 0.3 percent, based on the weight of the dry solids in the puree. After the color preservatives have been added, this portion may be dried to about 3 percent moisture on a double drum dryer which is operated at approximately two revolutions per minute and is heated with 78° p.s.i. steam pressure.

A suitable mode for carrying out the invention is set forth in the following examples:

Example I

Sweet potatoes which were of the Nugget variety and had an average processing solids content were peeled, trimmed and washed whereupon they were comminuted through a screen having 0.03 inch openings thereby forming a puree. The comminuted material was then continuously pumped through a first steam inline injection cooker at a flow rate of approximately 60 feet per minute where the temperature of the product was raised to 176° F. in substantially four seconds. This represents the first cooking stage. After the first cooking stage, the comminuted potato was continuously fed into a conditioning tank in which it remained for twenty minute to allow further saccharification of the starch and the occurring of other beneficial effects. After the twenty-minute hydrolyzation period, the puree was then pumped through a second steam inline injection cooker where the temperature of the product was rapidly raised to 212° F. The puree thus processed was in condition to be canned, frozen or dried by a conventional process. It was found that the total solids content consisted of 58 percent sugar and that the total soluble solids in the puree was 17 percent based on the weight thereof.

Example II

The process of Example I was followed with the exception that the first steam inline injector cooker raised the temperature of the puree up to only 122° F. which is the recommended temperature for saccharifying starches as found in the prior art. It was found that the end product contained essentially the same concentration of starch and sugar as before the process was initiated. Also, this product had a starchy, uncooked taste and was generally unfit for human consumption. It was found that the total solids content consisted of 38 percent sugar and that the total soluble solids in the puree was 17 percent based on the weight thereof.

Example III

The process of Example I was repeated with the exception that the first steam injector cooker raised the temperature of the puree up to 200° F. which is beyond the temperature range recommended for saccharifying sweet potato starches. The end product was similar to that of Example II in that the puree had a starchy, uncooked taste. It was concluded that this high temperature either destroyed the saccharification qualities of the enzymes or killed the enzymes themselves.

Example IV

A 500 pound batch of Nugget variety sweet potatoes which were freshly harvested were peeled, washed and trimmed after which they were fed by a conveyor into a comminutor mill. In the mill, the sweet potatoes were ground into a puree through a screen having 0.04 inch openings. The puree was then pumped through a first steam inline injection cooker at a rate of approximately four gallons per minute. The steam which entered the injection cooker was under 30 pounds of pressure and raised the temperature of the puree to 168° F. in approximately 5 seconds. The puree after leaving the first cooker was pumped through connecting lines which passage consumed a period of about 20 seconds whereupon it was dumped into a conversion tank. In the conversion tank, the temperature of the puree remained at approximately 165° F. for a period of about 45 minutes. In the line leading away from the conversion tank, it was found that the total solids content was 51 percent sugar and that the process had hydrolyzed 38 percent of the total solids into maltose. It can be seen that although the conversion percentage was not quite as high as in Example I, it is still acceptable. The hydrolyzed puree was then reheated to 220° F. by a second steam inline injection cooker. The cooked puree had a 20 percent total solids content. The sweet potato puree was then ready to be frozen, canned or dehydrated.

Example V

A 700 pound batch of Nugget variety sweet potatoes of average processing solids were peeled, trimmed and washed. These potatoes had been cured at around 85° F. for six days after which they had been stored for four weeks in a sweet potato warehouse at about 60° F. The potatoes were comminuted through a screen having 0.03 inch openings thereby forming a puree. The freshly formed puree was then continuously pumped through a first steam inline injection cooker where the temperature of the puree was raised to 175° F. in four seconds. After this first cooking step, the comminuted potato was continuously fed into a conditioning tank in which it remained at a temperature of 170° F. for three minutes to complete the saccharification of the starch which had partially completed its hydrolysis during storage. The puree was then pumped through a second steam inline injection cooker where the temperature of the product was rapidly raised to 210° F. After being cooled, this puree was in condition to be canned, frozen or dried. It was found that the end product had a delightful and unusual flavor for products of this nature.

Many different embodiments of this invention may be made without departing from the scope and spirit thereof. Therefore, it is to be understood that the invention is not to be limited to the limitations shown and described herein, except as defined in the appended claims.

I claim:
1. A method for saccharifying and liquefying sweet potatoes comprising the steps of
   (a) comminuting washed and peeled sweet potatoes to form a substantially fine particle sweet potato puree,
   (b) substantially instantaneously raising the temperature of successive quantities of said puree to a range from 160° F. to 185° F. to initiate enzyme activity on a self-sustaining basis,
   (c) collecting said heated quantities in a puree mass and maintaining the temperature of said puree mass in said 160° F. to 185° F. range for a period of at least two minutes to achieve a predetermined hydrolysis of the starch in said puree mass, and
   (d) further raising the temperature of said puree above 190° F. to stop said enzyme activity.

2. A method for saccharifying and liquefying sweet potatoes comprising the steps of
   (a) comminuting washed and peeled sweet potatoes to form a substantially fine particle sweet potato puree,
   (b) raising the temperature of successive quantities of said puree to a range from 160° F. to 185° F., said puree quantities being raised to said temperature range within a 10 second period to initiate enzyme activity on a self-sustaining basis,
   (c) collecting said heated quantities in a puree mass and maintaining the temperature of said puree mass in said 160° F. to 185° F. range for a period of at least two minutes to achieve a predetermined hydrolysis of the starch in said puree mass, and
   (d) raising the temperature of said puree above 190° F. within 10 seconds to stop said enzyme activity.

3. A method for saccharifying and liquefying sweet potatoes comprising the steps of
   (a) comminuting washed and peeled sweet potatoes to form a sweet potato puree which is comprised of particles having a diameter of less than 0.06 inch,
   (b) elevating the temperature of successive quantities of said puree to a range from 160° F. to 185° F. within a 10 second period to initiate enzyme activity on a self-sustaining basis,
   (c) collecting said heated quantities in a puree mass and maintaining the temperature of said puree mass in said 160° F. to 185° F. range for a period of at least two minutes to achieve a predetermined hydrolysis of the starch in said puree mass, and
   (d) further raising the temperature of said puree above 190° F. within 10 seconds to stop said enzyme activity.

4. A method for saccharifying and liquefying sweet potatoes comprising the steps of
   (a) comminuting washed and peeled sweet potatoes to form a sweet potato puree which is comprised of particles having a diameter of less than 0.06 inch,
   (b) activating the saccharifying enzymes in said puree such that the enzyme activity is self-sustaining by substantially instantaneously raising the temperature of successive quantities of the same to the range from 160° F. to 185° F.,
   (c) collecting said heated quantities in a puree mass and maintaining said puree mass within said temperature range for at least two minutes to achieve a predetermined hydrolysis of the starch in said puree mass, and
   (d) inactivating said enzymes in said puree by raising the temperature of the same to at least 190° F.

5. The method of claim 4 wherein each temperature rise is effected within 10 seconds.

6. A method of saccharifying and liquefying sweet potato puree in preparation for processing by canning, freezing, dehydrating and other preservation techniques comprising the steps of
   (a) comminuting freshly harvested, washed and peeled sweet potatoes to form a sweet potato puree which is comprised of particles having a diameter of less than 0.06 inch,
   (b) activating the saccharifying enzymes in said puree such that the enzyme activity is self-sustaining by raising the temperature of successive quantities of the same to the raange from 160° F. to 185° F., said rise in temperature of said puree quantities being effected within 10 seconds by associating steam under pressure with the same,
   (c) collecting said heated quantities in a puree mass and maintaining said puree mass at a temperature of at least 140° F. for a period of time sufficient to allow a conversion of from 14 percent to 20 percent by weight of said puree to soluble solids by enzyme hydrolysis, and
   (d) inactivating the saccharifying enzymes in said puree by raising the temperature of the same to at least 190° F., said rise in temperature being effected within 10 seconds by associating steam under pressure with said puree.

7. A method of saccharifying and liquefying sweet potato puree in preparation for processing by canning, freezing, dehydrating and other preservation techniques comprising the steps of
   (a) comminuting freshly harvested, washed and peeled sweet potatoes to form a sweet potato puree which is comprised of particles having a diameter of less than 0.06 inch,
   (b) activating the saccharifying enzymes in said puree such that the enzyme activity is self-sustaining by raising the temperature of successive quantities of the same to about 176° F. within a 10 second period by associating steam under pressure with the same,
   (c) collecting said heated quantities in a puree mass and maintaining said puree mass at a temperature of at least 160° F. for at least 20 minutes so as to allow sufficient enzyme hydrolysis of said puree mass, and
   (d) inactivating the saccharifying enzymes in said puree by raising the temperature of the same to at least 210° F., said rise in temperature being effected within 10 second by associating steam under pressure with said puree.

8. A method of saccharifying and liquefying sweet potato puree in preparation for processing by canning, freezing, dehydrating and other preservation techniques comprising the steps of
   (a) comminuting freshly harvested, washed and peeled sweet potatoes to form a sweet potato puree which is comprised of particles having a diameter of less than 0.06 inch,
   (b) activating the saccharifying enzymes in said puree such that the enzyme activity is self-sustaining by raising the temperature of successive quantities of the same to about 176° F. within a 10 second period by associating steam under presure with the same,
   (c) collecting said heated quantities in a puree mass and maintaining said puree mass at a temperature of at least 160° F. for a period of time sufficient to allow a conversion of from 14 percent to 20 percent by weight of said puree to soluble solids by enzyme hydrolysis, and
   (d) inactivating the saccharifying enzymes in said puree by raising the temperature of the same to at least 210° F., said rise in temperature being effected within 10 seconds by associating steam under pressure with said puree.

9. A method for saccharifying and liquefying sweet potatoes comprising the steps of
   (a) comminuting washed and peeled sweet potatoes to form a substantially fine particle sweet potato puree,
   (b) substantially instantaneously raising the temperature of successive quantities of said puree to a range from 160° F. to 185° F., said temperature range activating the saccharifying enzymes in said puree such that the enzyme activity is self-sustaining,
   (c) collecting said heated quantities in a puree mass and maintaining said puree mass at a temperature of at least 140° F. for a period of time sufficient to allow a conversion of from 14 percent to 20 percent by weight of said puree to soluble solids by enzyme hydrolysis, and
   (d) inactivating the saccharifying enzymes in said puree by raising the temperature of the same to at least 190° F.

10. A method for saccharifying and liquefying sweet potatoes comprising the steps of
    (a) comminuting washed and peeled sweet potatoes to form a sweet potato puree which is comprised of particles having a diameter of less than 0.06 inch,
    (b) activating the saccharifying enzymes in said puree such that the enzyme activity is self-sustaining by substantially instantaneously raising the temperature of successive quantities of the same to the range from 160° F. to 185° F.
    (c) collecting said heated quantities in a puree mass and maintaining said puree mass at a temperature of at least 140° F. for a period of time sufficient to allow a conversion of from 14 percent to 20 percent by weight of said puree to soluble solids by enzyme hydrolysis, and
    (d) inactivating said enzymes in said puree by raising the temperature of the same to at least 190° F.

11. A method of saccharifying and liquefying sweet potato puree in preparation for processing by canning, freezing, dehydrating and other preservation techniques comprising the steps of
    (a) comminuting sweet potatoes to form a sweet potato puree which is comprised of particles having a diameter of less than 0.06 inch,
    (b) moving said particles in the presence of injected steam so as to intermingle said steam and particles to raise the temperature thereof within the range of 160° F. to 185° F. within 10 seconds thereby activating the saccharifying enzymes in said puree such that the enzyme activity is self-sustaining,
    (c) collecting said puree as a mass and maintaining said puree mass at a temperature of at least 140° F. for a period of time sufficient to allow a conversion of from 14 percent to 20 percent by weight of said puree to soluble solids by enzyme hydrolysis, and
    (d) moving said particles in the presence of injected steam so as to intermingle said steam and particles to raise the temperature thereof to at least 190° F. within 10 seconds thereby inactivating the sacharifying enzymes in said puree.

References Cited

UNITED STATES PATENTS 2,598,838   6/1952   Schermerhorn _____ 99—100

OTHER REFERENCES

Winton, A. L., et al.: The Structure and Composition of Foods, John Wiley & Sons, N.Y., 1935, TX541 W5S (p. 109).

Gore, H. C.: Formation of Maltose in Sweet Potatoes on Cooking, Industrial and Engineering Chemistry, vol 15, 1923 (pp. 938–940).

A. LOUIS MONACELL, *Primary Examiner.*

D. M. NAFF, *Assistant Examiner.*